United States Patent [19]

Kubo et al.

[11] Patent Number: 4,636,433

[45] Date of Patent: Jan. 13, 1987

[54] MAGNETIC POWDERS FOR MAGNETIC RECORDING MEDIA AND MAGNETIC RECORDING MEDIA EMPLOYING SAID MAGNETIC POWDER THEREIN

[75] Inventors: Osamu Kubo; Tutomu Nomura, both of Yokohama; Tadashi Ido, Ebina; Hirotaka Yokoyama, Yokosuka, all of Japan

[73] Assignee: Kabushiki Kaisha Toshiba, Kawasaki, Japan

[21] Appl. No.: 795,130

[22] Filed: Nov. 5, 1985

[30] Foreign Application Priority Data

Nov. 30, 1984 [JP] Japan ................................ 59-251564

[51] Int. Cl.⁴ ................................................ G11B 5/70

[52] U.S. Cl. ................................ 428/328; 252/62.57; 252/62.58; 252/62.59; 252/62.56; 252/62.54; 252/62.63; 427/128; 428/329; 428/694; 428/400; 360/134; 360/135; 360/136

[58] Field of Search ................ 427/131, 128; 428/329, 428/694, 328, 900; 252/62.57, 62.58, 62.59, 62.63, 62.56, 62.54; 360/134–136

[56] References Cited

U.S. PATENT DOCUMENTS

| | | | |
|---|---|---|---|
| 3,114,714 | 12/1963 | Braun | 252/62.57 |
| 3,117,935 | 1/1964 | Braun | 252/62.57 |
| 3,638,207 | 1/1972 | Smith | 252/62.57 |
| 4,341,648 | 7/1982 | Kubo | 252/62.58 |
| 4,425,401 | 1/1984 | Ido | 428/330 |
| 4,493,779 | 1/1985 | Kamiyama | 252/62.59 |
| 4,493,874 | 1/1985 | Kubo | 252/62.58 |
| 4,543,198 | 9/1985 | Kamiyama | 252/62.59 |
| 4,561,988 | 12/1985 | Nagai | 252/62.59 |
| 4,569,775 | 2/1986 | Kubo | 252/62.63 |

FOREIGN PATENT DOCUMENTS

| | | | |
|---|---|---|---|
| 086103 | 6/1980 | Japan | 428/329 |
| 063715 | 4/1985 | Japan | 428/329 |

*Primary Examiner*—Ellis P. Robinson
*Attorney, Agent, or Firm*—Schwartz, Jeffery, Schwaab, Mack, Blumenthal & Evans

[57] ABSTRACT

A magnetic powder for magnetic recording media comprises a hexagonal crystalline system ferrite containing, as essential components for said hexagonal crystalline system ferrite, iron and oxygen, and at least one of the elements selected from the group of Ba, Sr, Ca and Pb, said iron being substituted by at least one of the elements selected from the group of Ti, Co, Ni, Mn, Cu, Zn, In, Ge, Nb, Zr and Sb; and at least one of Ba, Sr, Ca, Pb being substituted by at least one of the rare earth elements selected from the group of Ce, Pr, Nd, Pm, Sm and Eu. The magnetic powder has a mean particle size of 0.01 to 0.3 $\mu$m and a coercive force of 200 and 2000 Oe. The magnetic powder is improved in its saturation magnetization while retaining a suitable coercive force. Accordingly, high reproduction output can be obtained in a magnetic recording medium employing the magnetic powder.

12 Claims, No Drawings

MAGNETIC POWDERS FOR MAGNETIC RECORDING MEDIA AND MAGNETIC RECORDING MEDIA EMPLOYING SAID MAGNETIC POWDER THEREIN

BACKGROUND OF THE INVENTION

This invention relates to a magnetic powder for magnetic recording media which can maintain proper or suitable coercive force (Hc) and also has a high saturation magnetization ($\sigma s$) and to a magnetic recording medium whose electromagnetic transducing characteristics, especially reproduction output, may be improved by use of said magnetic powder.

There have been used magnetic recording media for video recording, digital recording, etc. prepared by coating the surface of a substrate with needle-shaped magnetic particles of such as $\gamma$-$Fe_2O_3$ and $CrO_2$ and orientating the particles. In such cases, the particle size of the magnetic powder is required to be sufficiently smaller than the minimum recording unit to obtain a satisfactory S/N ratio. For example, in the case of video recording currently practiced, a needle-shaped magnetic powder having the length of about 0.3 $\mu m$ relative to the minimum recording wave length of about 1 $\mu m$ is employed. And recently a further improved recording density is desired. Accordingly, there is a strong demand for using a much finer magnetic particle rather than the needle-shaped magnetic powders currently used.

Now, as a magnetic powder for magnetic recording, the one with an easy axis of magnetization of uniaxial type is preferred. In other words, in the recording media currently used, the magnetic recording layer is furnished with uniaxial anisotropy, and signals are recorded therein in the direction of the easy axis of magnetization.

The present inventors have developed, as such a fine magnetic particle, a hexagonal crystalline system ferrite powder with a mean particle size of 0.3 $\mu m$ or less as disclosed in, for example, Japanese Patent Provisional Publication No. 86103/1980. Since said magnetic powder is not only of a finer particle compared with the conventional one formed by using $\gamma$-$Fe_2O_3$ or $CrO_2$ but also a hexagonal platelet in its shape and has an uniaxial easy axis of magnetization perpendicular to the surface of the platelet. Accordingly, a coated type recording medium of the perpendicular magnetization system may possibly be prepared. In view of the facts mentioned above, it can be said that the hexagonal crystalline system ferrite powder is a magnetic powder suitable for high-density recording.

Since such a hexagonal crystalline system ferrite itself usually has a coercive force (Hc) too high to carry out magnetic recording, it is necessary to reduce the Hc by substituting a part of constituting atoms by some other specific atoms.

However, there occurs an inconvenience that the saturation magnetization ($\sigma s$) of a substituted type hexagonal crystalline system ferrite which has been obtained through the substituting procedure mentioned above may decline compared with the same before substitution. For example, while in a case of Co-Ti substituted type Ba ferrite wherein the decline of s value is relatively small, the s value of Ba ferrite before substitution is approximately 70 emu/g; when the Hc of said ferrite is controlled down to 1,000 Oe or less by Co-Ti substitution, the $\sigma s$ value thereof may often decline to 60 emu/g or less. When compared with a conventional fine metal particle such as Fe metal or Fe-Co, Fe-Ni, Fe-Co-Ni alloy, etc., and further when compared with the conventional needle-shaped $\gamma$-$Fe_2O_3$ particle whose $\sigma s$ value is approximately 70 emu/g, the $\sigma s$ value of said ferrite may become lower.

The $\sigma s$ value of this magnetic powder is an important parameter by which the properties of a magnetic recording medium prepared by use of said magnetic powder, particularly on reproduction output, may be greatly influenced. And the decline of the $\sigma s$ induces the decline of reproduction output of the magnetic recording medium.

Thus, as a hexagonal crystalline system ferrite, the one whose Hc is adjusted at a proper or suitable value and also with high $\sigma s$ value is now strongly desired.

SUMMARY OF THE INVENTION

An object of this invention is to provide a magnetic powder for magnetic recording media which can maintain proper or suitable coercive force (Hc) and also has a high saturation magnetization ($\sigma s$) and a magnetic recording medium whose electromagnetic transducing characteristics, especially reproduction output, may be improved by use of said magnetic powder.

The present inventors have made extensive studies to attain the object mentioned above. As a result, they found that by setting the mean particle size and the coercive force (Hc) of a hexagonal crystalline system ferrite within the range mentioned below, and by substituting one of the constituting atoms thereof by a rare earth element(s) with an atomic ratio mentioned below, the saturation magnetization ($\sigma s$) of said ferrite can be improved.

DESCRIPTION OF PREFERRED EMBODIMENT

More specifically, a magnetic powder for magnetic recording media of this invention comprises a hexagonal crystalline system ferrite containing, as essential components for said hexagonal crystalline system ferrite, iron and oxygen, and at least one of the elements selected from the group of Ba, Sr, Ca and Pb; said iron being substituted by at least one of the elements selected from the group of Ti, Co, Ni, Mn, Cu, Zn, In, Ge, Nb, Zr and Sb, and further at least one of Ba, Sr, Ca, Pb being substituted by at least one of the rare earth elements selected from the group of Ce, Pr, Nd, Pm, Sm and Eu; and which magnetic powder having a mean particle size of 0.01 to 0.3 $\mu m$ and a coercive force of 200 to 2000 Oe, and a magnetic recording medium formed by employing said magnetic powder comprises a substrate and a magnetic layer applied to the surface thereof, wherein the magnetic powder contained in said magnetic layer comprises said hexagonal crystalline system ferrite powder.

The magnetic powder of this invention comprises a hexagonal crystalline system ferrite having a mean particle size of 0.01 to 0.3 $\mu m$, preferably 0.03 to 0.1 $\mu m$. While in cases where the mean particle size is less than 0.01 $\mu m$, ferromagnetism thereof will be lost, in cases where it is more than 0.3 $\mu m$, each particle may be formed into a multi-domain structure, either of which is not favorable.

As a magnetic powder of this invention, various types of hexagonal crystalline system ferrites, e.g. Type M, Type W, etc., may be applicable. Generally, ferrites of Types M and W are represented by the formula of $AO \cdot 6Fe_2O_3$ and $AFe_{18}O_{27}$, respectively. Of these types, Type M, i.e. a magnetoplumbite type, is especially preferred in that it may be easily crystallized. Therefore, the magnetic powders in the following description will be made based on a magnetoplumbite type hexagonal crystalline system ferrite.

The ferrite of Type M may be represented by the formula, $AO \cdot 6Fe_2O_3$, as mentioned above i.e. $A \cdot Fe_{12}O_{19}$, wherein A represents at least one of the elements selected from the group of Ba, Sr, Ca and Pb.

Accordingly, there may be mentioned, as constituting elements of hexagonal crystalline system ferrite of this invention, first of all, iron and oxygen, and further at least one of the elements selected from the group of Ba, Sr, Ca and Pb, preferably Ba.

In order to reduce Hc, iron which is one of the above-mentioned constituting elements may be substituted, for example, by an element(s) mentioned below. Namely, as such elements there may be mentioned at least one of the elements selected from the group of Ti, Co, Ni, Mn, Cu, Zn, In, Ge, Nb, Zr and Sb. Preferably, one element of iron may be substituted by two elements, that are Ti and Co.

Thus, when the above substituting element(s) and the substitution value of iron substituted by a substituting element(s) are represented by Q and Y, respectively, said ferrite of Type M may be represented by the formula, $A \cdot Fe_{12-Y}Q_YO_{19}$. Y is within the range of 1 to 2.2, preferably 1.5 to 2.0.

In order to reduce the Hc as mentioned above, iron may be substituted by a substituting element(s) Q so that the Hc of said ferrite may be 200 to 2,000 Oe, preferably 500 to 1500 Oe.

In cases where the Hc is less than 200 Oe, the maintenance of recorded signals may become difficult; on the other hand, when it is more than 2,000 Oe, recording may be difficult since the magnetic field of a magnetic head will be saturated.

In this invention, for the purpose of obviating the decline of the $\sigma s$ caused by reducing the Hc as mentioned above, A contained in said ferrite, i.e. at least one of the elements selected from the group of Ba, Sr, Ca and Pb, may be substituted by at least one of the rare earth elements selected from the group of Ce, Pr, Nd, Pm, Sm and Eu, preferably Pr and/or Nd.

The atomic ratio X in this substitution is in the relationship represented by the formula, $A_{1-X}M_X$, when M represents a rare earth element(s). And X may preferably be set within the range of 0.05 to 0.2, more preferably 0.1 to 0.15. When the atomic ratio X is less than 0.05, improvement of $\sigma s$ may not be sufficient. On the other hand, when X is more than 0.2, $\sigma s$ may decline conversely.

As mentioned heretofore, a magnetic powder of this invention comprises, in addition to iron and oxygen, A (at least one of the elements selected from the group of Ba, Sr, Ca and Pb), Q (at least one of the elements selected from the group of Ti, Co, Ni, Mn, Cu, Zn, In, Ge, Nb, Zr and Sb) and M (at least one of the rare earth elements selected from the group of Ce, Pr, Nd, Pm, Sm and Eu), and is represented by the formula, $A_{1-X}M_X Fe_{12-Y}Q_YO_{19}$.

Since in a hexagonal crystalline system ferrite consisted of the various elements mentioned above, substitution is carried out between ions of different valences, it will be necessary to compensate the difference between the valences of the ions. For example, in cases where an $A^{2+}$ ion is substituted by an $M^{3+}$ ion, the substitution of an $Fe^{3+}$ ion by a divalent ion such as $Zn^{2+}$, $Co^{2+}$, $Ni^{2+}$, etc., or by substituting an $A^{2+}$ ion by an monovalent alkali ion etc. may be carried out in order to compensate the difference between the valences of the ions.

In the ferrite of Type M, wherein A represents Ba and Q represents Ti+Co, said ferrite which has been compensated the difference between the valences of the ions by Fe and Co may be represented by the formula: $Ba_{1-X}M_XFe_{12-(X+2Y)}Ti_YCo_{X+Y}O_{19}$.

As a process for preparing a magnetic powder of this invention, there may possibly be adopted, for example, a coprecipitation-calcination method, hydrothermal synthesis method, etc., in addition to a glass-crystallization method where the oxides and carboxides of each element which are essential for forming of the desired barium ferrite are permitted to be fused with a glass-forming material such as borate, then the thus obtained fused liquid may be quenched to form an oxide glass, subsequently which oxide glass may be subjected to heat treatment at a predetermined temperature to precipitate the desired crystalline powder of barium ferrite and finally the glass component may be removed in an acid bath.

This magnetic recording medium employing the above-mentioned magnetic powder comprises a substrate and a magnetic layer. The magnetic layer is comprised of, in addition to the above-mentioned magnetic powders, a binder resin and additives such as a dispersing agent, a lubricant, a hardening agent, an abrasive agent, etc.

As a binder resin, there may be mentioned, for example, a vinyl chloride-vinyl acetate copolymer, a nitrocellulose, a polyurethane resin, etc; as a dispersing agent, there may be mentioned, for example, a lecithin, etc.; as a lubricant, there may be mentioned, for example, a higher fatty acid, an ester of fatty acid, etc.; as a hardening agent, there may be mentioned, for example, an isocyanate compound of bifunctional or of more, etc.; and as an abrasive agent, there may be mentioned, for example, $Cr_2O_3$, $Al_2O_3$, $\alpha$-$Fe_2O_3$ and so on.

As to a substrate, there may be used, for example, a polyethylene terephthalate film, nylon resin, polyimide resin, etc.

As a method of preparing a magnetic recording medium, there may be adopted, for example, an ordinary method where a magnetic powder, a binder resin and additives are kneaded together with a solvent to prepare a magnetic coating material, then a substrate is coated therewith and the thus treated substrate is further subjected to orientation processing, smoothing processing, drying treatment, etc. to complete a magnetic recording medium.

EXAMPLES

With using a hexagonal crystalline system ferrite of Type M, $BaFe_{10.8}Ti_{0.6}Co_{0.6}O_{19}$ substituted by Ti and Co as a basic material, a magnetic power was prepared wherein Ba had been substituted by Pr, Nd or Eu, either of which is a rare earth element according to glass-crystallization method. The control of the value of Pr, Nd or Eu for substitution was carried out by changing the value of X in the formula, $Ba_{1-X}M_XFe_{10.8-X}Ti_{0.6}Co_{0.6+X}O_{19}$ (M=Pr, Nd or Eu), according to the value shown in Table 1, and the compensation of the difference between the valences of the ions thereof was performed by using Fe and Co.

First, BaO, $Fe_2O_3$, $TiO_2$, CoO, $Pr_2O_3$, $Nd_2O_3$ or $Eu_2O_3$, the formulation of which had been adjusted so that the above-mentioned Ba ferrite composition may be constituted, were admixed all at the same time to a $B_2O_3 \cdot BaO$ glass and the resulting mixture was fused at 1350° C., followed by rolling and quenching to prepare a glass composition comprising the above-mentioned components.

Next, the thus obtained glass composition was heated at 850° C. for 4 hours to precipitate, in a matrix, Ba ferrite having been substituted by Ti, Co, Pr, Nd or Eu, followed by washing with an acetic acid to obtain a Ba ferrite magnetic powder.

The mean particle size of the thus obtained magnetic powder was measured to be 0.08 to 0.09 μm. The Hc and σs values thereof were also measured and are shown in Table 1.

As a Comparative Example, a ferrite which had not been substituted by a rare earth element(s), $BaFe_{12-2X}Ti_XCo_XO_{19}$, was prepared in the same manner as in Examples, and the Hc and σs values when X, the substitution value of Ti and Co, changed are also shown in Table 1.

TABLE 1

| | Substituting element | Substitution value: X | Saturation magnetization σs (emu/g) | Coercive force Hc (Oe) |
|---|---|---|---|---|
| Example 1 | Pr | 0 | 59 | 1700 |
| | | 0.03 | 59 | 1500 |
| | | 0.05 | 61 | 1400 |
| | | 0.10 | 62 | 1100 |
| | | 0.15 | 63 | 750 |
| | | 0.20 | 60 | 600 |
| | | 0.25 | 58 | 400 |
| | | 0.30 | 55 | 300 |
| Example 2 | Nd | 0 | 59 | 1700 |
| | | 0.03 | 59 | 1500 |
| | | 0.05 | 62 | 1400 |
| | | 0.10 | 63 | 1150 |
| | | 0.15 | 63 | 800 |
| | | 0.20 | 59 | 700 |
| | | 0.25 | 57 | 650 |
| | | 0.30 | 55 | 500 |
| Example 3 | Eu | 0 | 59 | 1700 |
| | | 0.03 | 59 | 1600 |
| | | 0.05 | 60 | 1500 |
| | | 0.10 | 61 | 1200 |
| | | 0.15 | 61 | 850 |
| | | 0.20 | 60 | 750 |
| | | 0.25 | 55 | 700 |
| | | 0.30 | 52 | 650 |
| Comparative Example | Ti, Co | 0.5 | 62 | 2200 |
| | | 0.6 | 60 | 1700 |
| | | 0.7 | 59 | 1000 |
| | | 0.8 | 59 | 750 |
| | | 0.9 | 58 | 400 |

Next, magnetic recording media were prepared according to an ordinary method by use of four kinds of magnetic powders selected from the thus obtained magnetic powders mentioned above: the one whose substitution value X of Pr, Nd or Eu is 0.15, respectively, and the one whose substituting value X of Ti and Co is 0.8, i.e., $Ba_{0.85}Pr_{0.15}Fe_{10.65}Ti_{0.6}Co_{0.75}O_{19}$ $Ba_{0.85}Nd_{0.15}Fe_{10.65}Ti_{0.6}Co_{0.75}O_{19}$ $Ba_{0.85}Eu_{0.15}Fe_{10.65}Ti_{0.6}Co_{0.75}O_{19}$ $BaFe_{10.4}Ti_{0.8}Co_{0.8}O_{19}$ Each composition of magnetic coating material forming the magnetic layer was prepared in the amount as shown in Table 2, followed by kneading thereof by use of a sand grinder, to obtain a magnetic coating material.

The thus obtained magnetic coating material was applied to the surface of a polyethylene terephthalate film, then this film was subjected to orientation processing in a magnetic field of perpendicular orientation at 4000 Oe, followed by drying to form magnetic recording media.

The reproduction outputs of these magnetic recording media at a recording wave length of 0.95 μm was measured by means of a ring type ferrite head (gap width: 0.2 μm, truck width: 35 μm, number of winding: 18 turns), and the results of which are shown in Table 2.

TABLE 2

| | Magnetic coating material | | | | | |
|---|---|---|---|---|---|---|
| | Substituting element | Magnetic powder | Binder resin | Dispersing agent | Solvent | Reproduction output (μV) |
| Example 1 | Pr | 80 (parts by weight) | Vinyl chloride vinyl acetate copolymer (10 parts by weight) | Lecithine (1 part by weight) and Stearic acid (0.2 part by weight) | Methyl isobutyl ketone (120 parts by weight) and Toluene (120 parts by weight) | 120 |
| Example 2 | Nd | 80 (parts by weight) | Vinyl chloride vinyl acetate copolymer (10 parts by weight) | Lecithine (1 part by weight) and Stearic acid (0.2 part by weight) | Methyl isobutyl ketone (120 parts by weight) and Toluene (120 parts by weight) | 120 |
| Example 3 | Eu | 80 (parts by weight) | Vinyl chloride vinyl acetate copolymer (10 parts by weight) | Lecithine (1 part by weight) and Stearic acid (0.2 part by weight) | Methyl isobutyl ketone (120 parts by weight) and Toluene (120 parts by weight) | 110 |
| Comparative | Ti, Co | 80 (parts by | Vinyl chloride vinyl acetate | Lecithine (1 part | Methyl isobutyl | 120 |

TABLE 2-continued

| | Magnetic coating material | | | | | |
|---|---|---|---|---|---|---|
| | Substituting element | Magnetic powder | Binder resin | Dispersing agent | Solvent | Reproduction output (μV) |
| Example | | weight) | copolymer (10 parts by weight) | by weight) and Stearic acid (0.2 part by weight) | ketone (120 parts by weight) and Toluene (120 parts by weight) | |

As is obvious from the Examples of the invention mentioned above, the magnetic powder of this invention is improved in its saturation magnetization at a state where a proper or suitable coercive force is maintained. Accordingly, in a magnetic recording medium employing a magnetic powder of this invention, high reproduction output may be obtained and its industrial value is great.

We claim:

1. A magnetic powder for magnetic recording media, comprising a magnetoplumbite type hexagonal crystalline system ferrite represented by the formula:

$$A_{1-X}M_XFe_{12-Y}Q_YO_{19}$$

wherein A represents at least one of the elements selected from the group of Ba, Sr, Ca and Pb; Q represents at least one of the elements selected from the group of Ti, Co, Ni, Mn, Cu, Zn, In, Ge, Nb, Zr and Sb; M represents at least one of the rare earth elements selected from the group of Ce, Pr, Nd, Pm, Sm and Eu; X represents an atomic ratio of M; and Y represents an atomic ratio of Q and ranges in value from about 1 to 2.2, said magnetic powder having a mean particle size of 0.01 to 0.3 μm and a coercive force of 200 to 2000 Oe.

2. The magnetic powder for magnetic recording media according to claim 1, wherein X ranges in value from about 0.05 to 0.2.

3. The magnetic powder for magnetic recording media according to claim 2, wherein A represents Ba and M represents Pr, Nd or Eu.

4. The magnetic powder for magnetic recording media according to claim 1 wherein Q represents Ti and Co.

5. The magnetic powder for magnetic recording media according to claim 1, wherein the hexagonal crystalline system ferrite has a mean particle size of 0.03 to 0.10 μm and a coercive force of 400 to 1500 Oe.

6. A magnetic recording medium comprising a substrate and a magnetic layer applied to the surface of said substrate, wherein said magnetic layer comprises a magnetoplumbite type hexagonal crystalline system ferrite represented by the formula:

$$A_{1-X}M_XFe_{12-Y}Q_YO_{19}$$

wherein A represents at least one of the elements selected from the group of Ba, Sr, Ca and Pb; Q represents at least one of the elements selected from the group of Ti, Co, Ni, Mn, Cu, Zn, In, Ge, Nb, Zr and Sb; M represents at least one of the rare earth elements selected from the group of Ce, Pr, Nd, Pm, Sm and Eu; X represents an atomic ratio of M; and Y represents an atomic ratio of Q and ranges in value from about 1 to 2.2, said magnetic powder having a mean particle size of 0.01 to 0.3 μm and a coercive force of 200 to 2000 Oe.

7. The magnetic recording medium according to claim 6, wherein X ranges in value from about 0.05 to 0.2.

8. The magnetic recording medium according to claim 7, wherein A represents Ba and M represents Pr, Nd or Eu.

9. The magnetic recording medium according to claim 6 wherein Q represents Ti and Co.

10. The magnetic recording medium according to claim 6 wherein the hexagonal crystalline system ferrite has a mean particle size of 0.03 to 0.10 μm and a coercive force of 400 to 1500 Oe.

11. The magnetic recording medium according to claim 7, wherein X has a value between about 0.1 and 0.15.

12. The magnetic powder for magnetic recording media according to claim 1, wherein X has a value between about 0.1 and 0.15.

* * * * *